Jan. 22, 1946.    J. C. MORPETH    2,393,552
GAUGING APPARATUS FOR THE MEASUREMENT OF VACUA
Filed Sept. 10, 1943
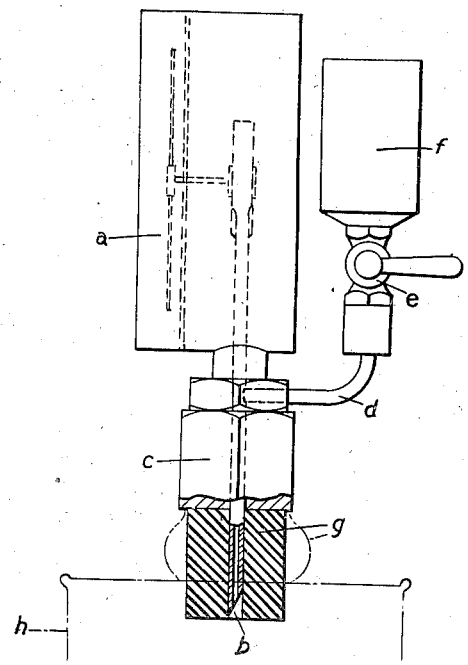
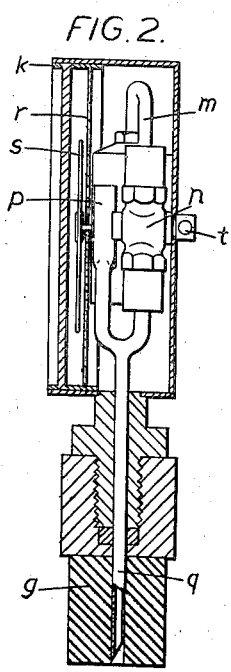
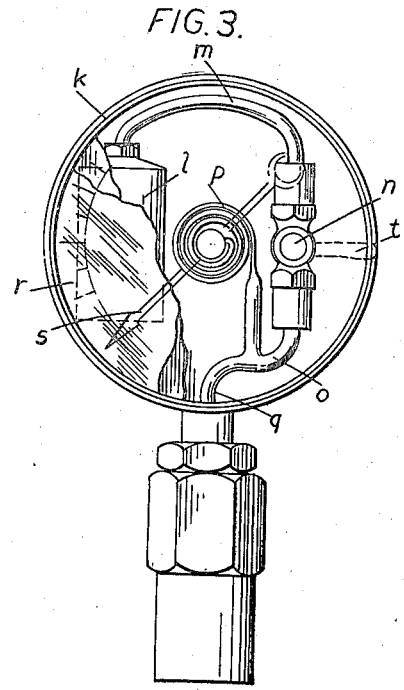
Inventor
J. C. MORPETH
By
Attorneys Patented Jan. 22, 1946

2,393,552

UNITED STATES PATENT OFFICE 2,393,552

GAUGING APPARATUS FOR THE MEASUREMENT OF VACUA

James Charles Morpeth, London, England, assignor to British Food Manufacturers' Research Association, London, England, a British corporation Application September 10, 1943, Serial No. 501,877
In Great Britain March 16, 1943

3 Claims. (Cl. 73—52)

This invention relates to vacuum gauges such as are used for indicating the degree of vacuum attained in cans and other receptacles which have been evacuated by heat treatment or other means. The usual method of indicating the degree of vacuum obtained is to take one of the receptacles as a sample and to pierce it with a pointed hollow needle passing through a rubber ferrule and connected to a vacuum gauge. The package is of course destroyed in this operation, and only one out of a batch is selected for sampling. If the head space in the can or other receptacle is large in relation to the volume of air in the vacuum gauge proper the reading obtained may be sufficiently accurate for ordinary purposes, but if the head space is small the gauge reading will inevitably be substantially lower than the true vacuum, because at the start of the reading the gauge is itself filled with air and this is discharged into the partially evacuated space in the receptacle, so that the reading obtained is that of the resultant degree of vacuum throughout the head space of the receptacle and the interior of the gauge after this volume of air has spread into the head space. This error is obvious enough, but no steps have been taken in practice, with the object of avoiding it. In the case of small receptacles with a small head space, even if this is well evacuated to a high degree of vacuum, the reading obtained may be quite low.

It might be thought that it would be possible partly to avoid this difficulty by evacuating the gauge to a certain extent before use, but this would not ensure accurate readings unless the degree of evacuation corresponded with that in each container, and it would not be practicable because of the time taken to effect evacuation and the difficulty of manipulation. It is the object of the present invention to avoid the difficulty in a simple and effective manner.

According to the present invention a vacuum gauge is used which may be of the well known Bourdon type, or any other suitable type, the gauge proper having means for perforating the can or receptacle and making an air-tight connection between it and the gauge, while a tube leads to a separate enclosed space from which a second known volume of air can be admitted to the can or receptacle after the first gauge reading has been taken, so as to enable a second and lower gauge reading to be taken from which two readings substantially the true vacuum originally existing in the can or container can be deducted. In a preferred form of the device a branch tube leads through a cock or valve to a separate chamber, while this chamber preferably has such a capacity that when the cock is opened it admits a volume of air equal to that originally introduced by the gauge itself.

The separate chamber may be inside the casing of the vacuum gauge, only the handle projecting to the outside for operating the cock, or the chamber may be a separate fitting such as can be attached externally to an existing vacuum gauge.

The invention is illustrated by way of example in the accompanying drawing in which:

Figure 1 shows one form of the device in side view with the needle portion in section, the dotted lines showing it is use as applied to a container $h$ whose degree of vacuum is to be ascertained;

Figure 2 is a similar view showing a modified form of the device in section; and Figure 3 shows a face view of the device illustrated in Figure 2 with the dial $r$ partly broken away to show the parts behind it.

In Figure 1, $a$ is the vacuum gauge of known construction which is provided with a tubular stem $b$ pointed at its end to form a needle for perforating containers of metal. This tube is supported by a coupling $c$ at the base of the gauge, and has a branch pipe $d$ leading from it to a cock or valve $e$ and thence to a chamber $f$ whose internal cubic capacity down to the cock $e$ is preferably made equal to the internal capacity of the tube of the vacuum gauge $a$, and the tubes $b$ and $d$ taken together, with the cock $e$ closed, so that the mass of air under atmospheric pressure admitted to the container when perforated by the tube $b$ is the same as the further mass of air admitted to the container and to the gauge when the cock $e$ is opened. The needle end of the tube $b$ is surrounded by a ferrule or plug $g$ of soft india-rubber or like material which can be compressed longitudinally and will bulge laterally as shown in dotted lines when the needle end of the tube $b$ is thrust into the lid of a container $h$ to test the vacuum therein.

In Figures 2 and 3 the construction is similar to that of Figure 1 but in this case the casing of the gauge $k$ accommodates also the separate vessel $l$ connected by tube $m$ to cock $n$ whose stem and handle $t$ project on the outside. The other side of cock $n$ is connected to a branching tube $o$ one limb of which is united to the flattened gauge tube $p$, while the other limb leads to the tube $q$ having a needle end within the ferrule $g$ of rubber or the like. The dial of the gauge is lettered $r$ and its pointer $s$. Here again, the internal volume of $l$ and $m$ together should equal the internal volume of the gauge tube $p$ and the tubes $o$ and $q$ together, when the cock $n$ is closed.

When in use the method of operation is as follows:

The hollow needle of the gauge passes through the rubber ferrule $g$ which is wetted each time before use. The needle of the gauge is forced through the metal of the can $h$ or of the cover of a glass receptacle, for example, while the wetted rubber ferrule $g$ forms a seal around the needle. The reading of the vacuum gauge is taken in the usual manner but with the cock $e$ or $n$ leading to the separate air vessel $f$ or $l$ closed. This gives the reading which has been assumed to be the correct vacuum reading hitherto, although in fact it is only a reading of the vacuum attained in the combined volume of the gauge itself and the receptacle after the air from the gauge has entered the receptacle and come to a uniform pressure in the two vessels. After this reading has been taken the cock is opened, allowing another and preferably an equal volume of air from the chamber $f$, or $l$ and $m$, to become distributed through the head space in the receptacle, the vacuum gauge itself and the additional capacity of the added chamber, and a further reading is taken. If the capacity of the added chamber and its connections beyond the cock is equal to that of the gauge and its connections, it is possible to calculate substantially the true vacuum in the container from these two readings according to the following simple equation, the correctness of which can be readily verified:

$$Pc = \frac{PaPb}{2Pb - Pa}$$

In this equation $Pc$ is the vacuum in the head space of the receptacle which it is desired to estimate, $Pa$ is the first gauge reading and $Pb$ is the second gauge heading. Of course the second gauge reading is always lower than the first.

The above equation only applies with accuracy if the volume of air in the separate air chamber from the cock onwards is made equal to the volume of air in the gauge and its connections up to the cock and the needle tube. If these volumes are not equal then the equation becomes rather more complicated as hereinafter indicated to take into account the separate volumes. For simplicity therefore it is most desirable to make the volumes equal. After each time of use it is only necessary to open the cock $e$ or $n$ so that the air chamber and the gauge are filled with air at the pressure and temperature conditions in the room where the tests are being made, to close the cock again, and to use the gauge for a further reading as before.

In the case of some evacuated vessels, particularly those such as glass vessels containing preserved meats, with a large metal cover, the volume of the head space may not remain constant while the pressure readings are being taken because the cover may be partly pressed in by atmospheric pressure, and may recover somewhat as the degree of vacuum is lessened while the gauge readings are being taken. However, in a number of experiments upon containers of this type it has been found that the error due to this cause is comparatively small, particularly in the case of larger containers, and when the gauge is used as above described it gives a far closer approximation to the true vacuum reading than can be obtained by any method of gauging hitherto in use.

It will be seen that the essential feature of the invention is to provide means for enabling a second charge of air to be admitted into the container after the first reading has been taken in order to enable a second reading to be taken of the lower vacuum which exists when the second charge of air has been introduced, the second charge being preferably an equivalent amount of air to that introduced during the first reading by the air necessarily contained in the vacuum gauge tube. If for any reason it is found desirable to make the second charge of air different from the first it is still possible to calculate the correct vacuum if the initial volumes of air in the gauge and in the chamber are correctly known. The equation in fact becomes:

$$Pc = \frac{V_2 P_a P_b}{V_1 P_b + V_2 P_b - V_1 P_a}$$

in which $Pa$, $Pb$ and $Pc$ represent the same items as before, while $V_1$ represents the volume of the gauge and its connecting tube, and $V_2$ the volume of the additional air chamber from the cock onwards.

Although the invention has been described in a form in which the additional air chamber is connected with the tube of the vacuum gauge by a cock, it is obvious that it may be arranged to connect in any other convenient manner with the head space in the evacuated container after the first reading has been taken so as to enable the second reading to be made, and the structural details of the apparatus may be modified without departing from the scope of the invention. One form of vacuum gauge has been illustrated only by way of example and the invention can be applied for use with any of the usual types of vacuum gauges.

I claim:

1. A vacuum gauge mechanism adapted for use in indicating the degree of vacuum in a can or receptacle, comprising a vacuum gauge proper with means thereon for perforating the can or receptacle and making an airtight connection between it and the interior of the gauge, an enclosed space containing a known volume of air, a tube between said gauge and said enclosed space, and a cock in said tube whereby the known volume of air can be admitted to the can or receptacle after the first gauge reading has been taken, thus enabling a second and lower gauge reading to be taken, from which two readings substantially the true vacuum originally existing in the can or container can be deduced.

2. A vacuum gauge mechanism comprising a casing, a vacuum gauge tube therein, a dial and a pointer movably mounted in said casing with means for actuating said pointer from said gauge tube, a projecting tube with a pointed end extending from said gauge tube to outside said casing, means for making an airtight seal around said projecting tube upon a container into which said projecting tube may be thrust, a cock and a branch tube connected to said projecting tube, and a closed chamber communicating with said branch tube.

3. A vacuum gauge mechanism comprising a casing, a vacuum gauge tube therein, a dial and a pointer movably mounted in said casing with means for actuating said pointer from said gauge tube, a projecting tube with a pointed end extending from said gauge tube to outside said casing, means for making an airtight seal around said projecting tube upon a container into which said projecting tube may be thrust, a cock and a branch tube connected to said projecting tube, and a closed chamber communicating with said branch tube, the cubic capacity of the enclosed space in said branch tube and chamber beyond said cock being substantially equal to the cubic capacity of said gauge tube and projecting tube when said cock is closed.

JAMES CHARLES MORPETH.